United States Patent
Keller et al.

(10) Patent No.: US 9,430,243 B2
(45) Date of Patent: Aug. 30, 2016

(54) OPTIMIZING REGISTER INITIALIZATION OPERATIONS

(75) Inventors: James B. Keller, Redwood City, CA (US); John H. Mylius, Gilroy, CA (US); Conrado Blasco-Allue, Sunnyvale, CA (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 701 days.

(21) Appl. No.: 13/460,268

(22) Filed: Apr. 30, 2012

(65) Prior Publication Data
US 2013/0290680 A1    Oct. 31, 2013

(51) Int. Cl.
*G06F 9/38*    (2006.01)

(52) U.S. Cl.
CPC ............. *G06F 9/384* (2013.01); *G06F 9/3832* (2013.01); *G06F 9/3857* (2013.01)

(58) Field of Classification Search
CPC .............................. G06F 9/384; G06F 9/3857
USPC ......... 712/217, 210, 218, 226; 711/154, 210
See application file for complete search history.

(56) References Cited

U.S. PATENT DOCUMENTS

| | | | |
|---|---|---|---|
| 4,435,753 A | 3/1984 | Rizzi | |
| 5,452,426 A | 9/1995 | Papworth et al. | |
| 5,669,011 A | 9/1997 | Alpert et al. | |
| 5,696,957 A | 12/1997 | Yamaura et al. | |
| 5,768,610 A * | 6/1998 | Pflum | 712/23 |
| 5,881,263 A | 3/1999 | York et al. | |
| 6,094,716 A * | 7/2000 | Witt | 712/23 |
| 6,112,019 A | 8/2000 | Chamdani et al. | |
| 6,122,656 A | 9/2000 | Witt | |
| 6,122,725 A | 9/2000 | Roussel et al. | |

(Continued)

FOREIGN PATENT DOCUMENTS

| | | |
|---|---|---|
| JP | H05-265753 A | 10/1993 |
| TW | 201203110 A1 | 1/2012 |
| WO | 0004444 A1 | 1/2000 |

OTHER PUBLICATIONS

Kanter, David. "Intel's Sandy Bridge Microarchitecture." Real World Tech. Sep. 25, 2010. Web. Nov. 25, 2014. <http://www.realworldtech.com/sandy-bridge/5/>.*

(Continued)

*Primary Examiner* — Andrew Caldwell
*Assistant Examiner* — Michael Metzger
(74) *Attorney, Agent, or Firm* — Rory D. Rankin; Meyertons, Hood, Kivlin, Kowert & Goetzel, P.C.

(57) ABSTRACT

A system and method for efficiently reducing the latency of initializing registers. A register rename unit within a processor determines whether prior to an execution pipeline stage it is known a decoded given instruction writes a particular numerical value in a destination operand. An example is a move immediate instruction that writes a value of 0 in its destination operand. Other examples may also qualify. If the determination is made, a given physical register identifier is assigned to the destination operand, wherein the given physical register identifier is associated with the particular numerical value, but it is not associated with an actual physical register in a physical register file. The given instruction is marked to prevent it from proceeding to an execution pipeline stage. When the given physical register identifier is used to read the physical register file, no actual physical register is accessed.

14 Claims, 5 Drawing Sheets

(56) References Cited

U.S. PATENT DOCUMENTS

| | | | |
|---|---|---|---|
| 6,256,721 B1* | 7/2001 | Witt | 712/23 |
| 6,505,293 B1* | 1/2003 | Jourdan et al. | 712/217 |
| 6,553,483 B1 | 4/2003 | Jourdan et al. | |
| 6,594,754 B1* | 7/2003 | Jourdan et al. | 712/217 |
| 7,631,207 B1* | 12/2009 | Song et al. | 713/320 |
| 2010/0274961 A1 | 10/2010 | Golla et al. | |

OTHER PUBLICATIONS

Balakrishnan et al, "Exploiting Value Locality in Physical Register Files", in Proc. of MICRO-36, 2003. 12 pages.*

International Search Report and Written Opinion in application No. PCT/US2013/037793 mailed Sep. 5, 2013 pp. 1-16.

Extended European Search Report in European Application No. 13165090.5, mailed Apr. 17, 2014, 5 pages.

Yan, Jun et al., "Virtual Registers: Reducing Register Pressure Without Enlarging the Register File", Second International Conference on High-Performance Embedded Architectures and Compilers (HiPEAC 2007), Jan. 28-30, 2007, pp. 57-70, Springer Berlin Heidelberg, Ghent, Belgium.

Notice of Preliminary Rejection in Korean Patent Application No. 10-2013-48660, mailed Jul. 22, 2014, 7 pages.

Office Action in Japanese Patent Application No. 2013-095092, mailed Jul. 23, 2014, 7 pages.

Shinji Shiota, "Answer Book: Sandy Bridge Architecture", ASCII. technologies Apr. 2011, ASCII Media Works Inc., Apr. 2011, No. 4 vol. 16, pp. 29 to 35.

Hisa Ando, Basis of High Performance Computer Technology, Mainichi Communications K.K., Jun. 20, 2011, 1st Edition, pp. 231 to 237.

Final Office Action in Japanese Patent Application No. 2013-095092, mailed Dec. 8, 2014, 8 pages.

Communication pursuant to Article 94(3) EPC in European Application No. 13165090.5, mailed Nov. 17, 2014, 3 pages.

Notification of the First Office Action in Chinese Application No. 201310233474.6, mailed Mar. 18, 2015, 16 pages.

Office Action in Taiwan Patent Application No. 102115293, mailed Feb. 10, 2015, 12 pages.

Notification of the Second Office Action in Chinese Application No. 201310233474.6, mailed Dec. 2, 2015, 6 pages.

* cited by examiner

OPTIMIZING REGISTER INITIALIZATION OPERATIONS

BACKGROUND OF THE INVENTION

1. Field of the Invention

This invention relates to microprocessors, and more particularly, to efficiently reducing the latency of initializing registers.

2. Description of the Relevant Art

Microprocessors typically include overlapping pipeline stages and out-of-order execution of instructions. Additionally, microprocessors may support simultaneous multi-threading to increase throughput. These techniques take advantage of instruction level parallelism (ILP) in source code. During each clock cycle, a microprocessor ideally produces useful execution of a maximum number of N instructions per thread for each stage of a pipeline, wherein N is an integer greater than one. However, control dependencies and data dependencies reduce a maximum throughput of the microprocessor to below N instructions per stage.

Control dependencies caused by conditional control flow instructions serialize instructions at conditional forks and joins along the control flow graph of the source code. Speculative execution of instructions is used to perform parallel execution of instructions despite control dependencies in the source code.

A data dependency occurs when an operand of an instruction depends on a result of a younger instruction in-program-order. Data dependencies may appear either between operands of subsequent instructions in a straight line code segment or between operands of instructions belonging to subsequent loop iterations. In straight line code, read after write (RAW), write after read (WAR) or write after write (WAW) dependencies may be encountered. Register renaming is used to allow parallel execution of instructions despite the WAR and WAW dependencies. However, the true dependency, or RAW dependency, is still intact. Therefore, architectural registers used as a destination register and subsequently as a source register cause serialization of instruction execution for associated source code segments.

One example of a common RAW dependency with an architectural register is initializing a register to a particular value followed by use and/or testing of that register in later code. For example, particular initial values may be assigned to flags, counters and settings in a software application. One manner of initializing a register is using a move immediate instruction. Therefore, register initializations may occur frequently during the execution of programs and include the RAW dependency.

In view of the above, efficient methods and mechanisms for efficiently reducing the latency of initializing registers are desired.

SUMMARY OF EMBODIMENTS OF THE INVENTION

Systems and methods for efficiently reducing the latency of initializing registers. In one embodiment, a processor includes a register rename unit configured to receive decoded instructions and determine whether a decoded given instruction qualifies to be a zero cycle operation. A determination is made whether prior to an execution pipeline stage it is known a decoded given instruction writes a particular numerical value in a destination operand. An example is a move immediate instruction that writes a value of 0 in its destination operand. At least other Boolean logic operations and arithmetic operations may also qualify. If the determination is made, the rename register unit may assign a physical register number to the destination operand, wherein the physical register number is associated with the particular numerical value. In addition, the physical register number may not be associated with an actual physical register in a physical register file.

The control logic within the register rename unit may mark the given instruction to prevent it from proceeding in the processor pipeline. For example, the control logic may mark the given move instruction to indicate completion at the dispatch pipeline stage. Further, the physical register file may convey the particular numerical value without accessing an actual physical register when it receives the rename register number as a source operand to read.

These and other embodiments will be further appreciated upon reference to the following description and drawings.

Figure 1:
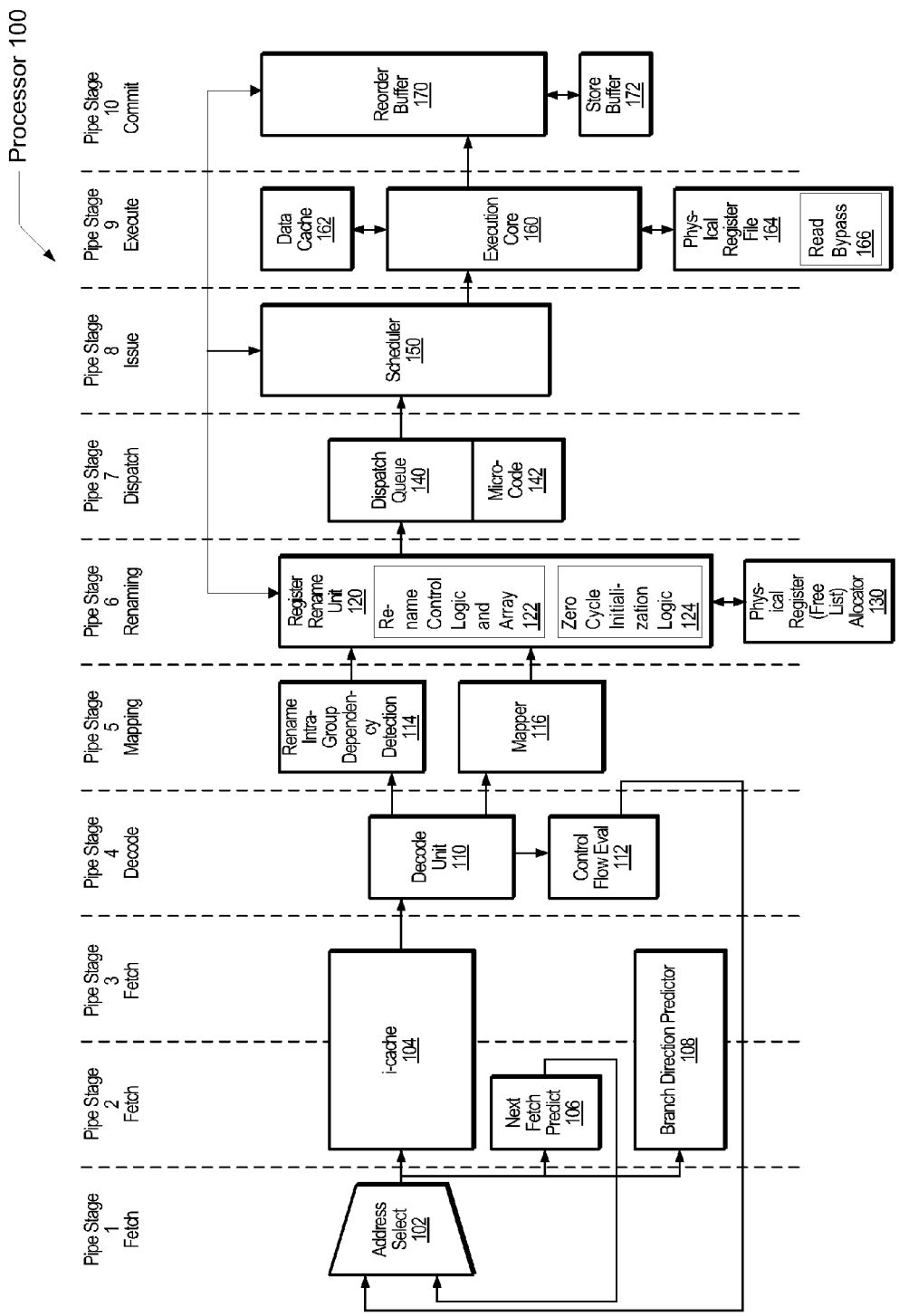
FIG. 1 is a generalized block diagram of one embodiment of a processor that performs superscalar, out-of-order execution with zero cycle register initialization operations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a processor 100 that performs superscalar, out-of-order execution with zero cycle register initialization operations is shown. The processor core 100 may utilize a multi-stage pipeline for processing of instructions. Although functional and control blocks are shown in a particular order and in a particular pipeline stage, other combinations are possible and contemplated. In addition, the functional and control blocks may occupy more than one pipeline stage. In most cases, a single pipeline stage is shown for each functional block for ease of illustration.

Instructions of a software application may be loaded into the i-cache 104 within the processor 100. The software application may have been stored in an external disk memory, external DRAM, and/or one of multiple peripheral devices. Generally speaking, when software programmers write applications to perform work according to an algorithm or a method, the programmers utilize variables to reference temporary and result data. This data utilizes space allocated in computer memory. The operating system allocates regions of memory for the software application.

During processing of the application, the data may be loaded from the allocated regions of memory into the data cache 162. Subsequently, one or more architectural registers within the physical register file 164 are used to load and store the temporary and result data. The architectural registers are architecturally visible. Therefore, a software programmer and/or a compiler may identify the architectural registers within the software application. The architectural registers are associated with a given instruction set architecture (ISA). The hardware in the processor 100 includes circuitry for processing instructions according to the given ISA. In various embodiment, the ARM instruction set architecture may be selected for the given ISA. Alternatively, the Alpha, PowerPC, SPARC, MIPS, x86, or any other ISA may be selected.

In various embodiment, the given ISA may be used to select a manner for declaring and allocating regions of memory. The given ISA may further determine steps for a processor reset and steps for switching between operating modes (e.g., supervisor mode, user mode). These steps and user applications may reset or initialize architectural registers to a particular numerical value using one or more instructions within the given ISA. In addition, these steps and user applications may reset any portion of a register file that may include a greater number of registers than a number of architecturally visible registers. Such a reset of the register file may cause the processor to behave in a predictable manner after the reset operation is complete. Typically, a state machine is used to insert operations that write a particular numerical value to each register within the register file. In some embodiments, this state machine may be removed and replaced with different logic as will be described below. Regarding operations that write a particular value to a register, in some embodiments a move immediate instruction may be used to move the particular numerical value into a given register within the register file. One example of a particular numerical value is the value zero. Other arithmetic instructions may also be used to perform the reset or initialization. Some examples of resetting a given register indicated by "r1" are shown in the following:

| mov | r1, 0     | // r1 ← 0        |
|-----|-----------|------------------|
| and | r1, r1, 0 | // r1 = r1 AND 0 |
| xor | r1, r1, r1| // r1 = r1 XOR r1|
| sub | r1, r1, r1| // r1 = r1 − r1  |
| mul | r1, r1, 0 | // r1 = r1 × 0   |

In the above examples, the destination operand is listed first followed by the source operand(s). However, the opposite convention is possible and contemplated. In addition, for the majority of the instructions, two source operands are listed. However, in cases that a particular architectural register is both a destination operand and a source operand, one source operand may be listed with the destination architectural register number implied as the second source operand. In the above examples, the intermediate value is shown as a numeral with no symbols. In other cases, a symbol may accompany the numeral. For example, in the ARM ISA, an intermediate value may use the prefix "#", such as "#0" instead of "0". The above instructions are meant to be a pseudocode example and language agnostic.

As seen from the above example code statements, multiple instruction types may be used to initialize the register r1 with a particular numerical value, such as the value zero. Some of the above instruction types may have lower latencies than other instruction types. In one example, the logical XOR and AND operations may complete before other instruction types. The arithmetic MUL, or multiply instruction, may have the longest latency of the above instruction types, and thus, may not be chosen for register initialization. Regardless of the instruction type, a significant percentage of the assembly language instructions used to implement the software programmer's application may include register initialization statements. Additionally, there may be software application statements not used for initialization, but the results may be known prior to an actual execution of the statement. The arithmetic multiply instruction shown above is one example. Reducing the latency of these types of statements may increase performance.

The processor 100 may include zero cycle initialization logic 124 that determines prior to an execution pipeline stage associated with a particular decoded instruction that the particular instruction writes a given numerical value in its destination operand. For example, when the instruction "mov r1, 0 // r1←0" is decoded, it is known the instruction is a move immediate type and the instruction writes the destination operand, r1, with the numerical value zero. The numerical value zero is in the immediate field of the move immediate instruction. In response to this determination, the zero cycle initialization logic 124 may direct the rename control logic 122 to assign a given rename register number to the destination operand, wherein the given rename register number is associated with the given numerical value.

Continuing with implementing the register initialization instruction as a zero cycle operation, the physical register file 164 may include multiple physical registers, each identified by an associated rename register number. However, the given rename register number assigned to the destination operand of the above move immediate instruction may not be associated with any one of the multiple physical registers. Rather, the given rename register number may be associated with the numerical value in the immediate field. In this case, the numerical value is zero.

In one embodiment, the physical register file 164 may have an 8-bit index, which could be used to uniquely identify one of 256 physical registers. In other embodiments, a different width of the index and a different number of physical registers may be used. Such other values are possible and contemplated. In an embodiment utilizing an 8-bit index, the physical register file may contain fewer than 256 actual physical registers. For example, physical register file 164 may include 120 physical registers, rather than 256 physical registers. These 120 physical registers may be identified using an 8-bit index with a value between 0 and 119 in decimal or some other format. In hexadecimal format, the 120 physical registers may be identified by an 8-bit index with a value from h00 to h77. In various embodiments, the 8-bit index 255 may not be associated with any one of the physical registers within the physical register file 164. Rather, the 8-bit index 255, or hFF, may be used to indicate the numerical value 0. In other embodiments, an index other than hFF could be selected to represent a given numerical value and numerical values other than 0 may be represented as well.

In various embodiments, the destination operand, which is r1, in the above move immediate instruction, may be renamed to P255. It is known the destination operand is written with the value zero, or otherwise corresponds to a value of zero. Further, the zero cycle initialization logic 124 may mark the first instruction to prevent it from proceeding in the pipeline of the processor. For example, the zero cycle initialization logic 124 may mark the move immediate instruction to indicate completion at a dispatch pipeline stage. In such embodiments, power consumption may be reduced within the processor 100, since the move immediate instruction may not proceed past the dispatch pipeline stage. In addition, throughput for other instructions may increase as the move immediate instruction does not utilize resources (queues, execution unit, staging flops, and so forth) after the dispatch pipeline stage that would otherwise be used. Again, in other embodiments, other values may be used for the width of the index and a number of physical registers identified by the index. In addition, a range of values for the index used to identify the physical registers may not include the smallest set of values or a contiguous range of values.

In some embodiments, the rename control logic 122 may bypass the rename register number P255 to one or more instructions that both are younger in-program-order than the given move immediate instruction and have a data dependency on the move immediate instruction. Further, in response to receiving the rename register number P255 as a source operand to read, the physical register file 164 may output the numerical value zero without reading any one of the multiple physical registers. The read bypass logic 166 within the physical register file 164 may detect the rename register number P255 is provided as a source operand to read by an instruction younger in-program-order than the move immediate instruction, wherein this younger instruction is dependent on the move immediate instruction. In response, no actual physical register is accessed. Rather, the read bypass logic 166 may decode the rename register number P255 and determine the numerical value zero is to be conveyed to a readout data port. It is noted that while logic within the register file is described as returning a given value such as zero in response to receiving the register number P255, in other embodiments logic that is not within or otherwise part of the register file may detect the register number and provide a given value. For example, in some embodiments logic such as bypass muxes that are included as part of a pipeline datapath may detect the register number and force a given value (e.g. zero) in response. In such embodiments, the register file itself may be unaware of the special feature associated with the particular register number. Numerous such embodiments are possible and are contemplated.

The above steps for the move immediate instruction "mov r1, 0// r1←0" may also be used for other instructions that write in a destination operand a particular numerical value known prior to an execute pipeline stage. The previous examples and an additional example of resetting an architectural register is shown in the following:

| mov | r1, 0 | // r1 ← 0 |
| and | r1, r1, 0 | // r1 = r1 AND 0 |
| xor | r1, r1, r1 | // r1 = r1 XOR r1 |

The zero cycle initialization logic 124 may determine prior to an execution pipeline stage associated with a particular decoded instruction that the particular instruction writes a given numerical value in its destination operand. In one embodiment, the logic 124 determines the instruction has an opcode for a move immediate instruction and the immediate value is a particular numerical value as described earlier. In other embodiments, the zero cycle initialization logic 124 determines the instruction has an opcode for a Boolean logical operation, such as an AND or an XOR. In addition, the logic 124 determines from the source operands that a result of 0 will be written in the destination operand during a later execute pipeline stage. For example, a source operand of 0 for the Boolean logical AND operation yields a result of 0.

In another example, two same source operands for the Boolean logical XOR operation yield a result of 0. Therefore, the similar steps described above regarding register renaming with a particular rename register number, such as P255, that is not associated with an actual physical register may be used. Likewise, the physical register file 164 may convey a value of 0 without accessing a physical register when it receives the rename register number P255 as a source operand to read. Similar to the above, other available physical register numbers not associated with an actual physical register may be used other than P255.

In further embodiments, the zero cycle initialization logic 124 determines a decoded instruction has an opcode for an arithmetic operation and determines from the source operands that a result of 0 will be written in the destination operand during a later execute pipeline stage. For example, an arithmetic subtraction operation with two same source operands yields a result of 0. Similarly, an arithmetic multiplication operation with a source operand of 0 produces a result of 0. Therefore, the similar steps described above regarding register renaming with a particular rename register number, such as P255, that is not associated with an actual physical register may be used. Likewise, the physical register file 164 may convey a value of 0 without accessing a physical register when it receives the rename register number P255 as a source operand to read. Examples of these arithmetic operations are again shown in the following:

| sub | r1, r1, r1 | // r1 = r1 − r1 |
| mul | r1, r1, 0 | // r1 = r1 × 0 |
| mov | r2, 1 | // r2 ← 1 |

In yet further embodiments, the zero cycle initialization logic 124 may determine the particular numerical value may be another value, such as one. For example, the last instruction shown above is a move immediate instruction that writes the numerical value one in the destination operand "r2". In one embodiment, the rename register number P255 may be reserved for the numerical value 0. Another available rename register number, such as P254, may be reserved for the numerical value 1. Therefore, the similar steps described above regarding register renaming with a particular rename register number that is not associated with an actual physical register may be used.

In the above example, the destination operand r2 may be renamed to the rename register number P254, which indicates the numerical value 1. Likewise, the physical register file 164 may convey a value of 1 without accessing a physical register when it receives the rename register number P254 as a source operand to read. Before continuing with further details regarding the conversion of register initialization instructions and other particular instructions to zero-cycle operations, a further description of the components in the computer system 100 is provided.

One or more instructions of a software application may be fetched from the i-cache 104. The one or more instructions may be indicated by an address conveyed by address select logic 102. Multiple instructions may be fetched from the i-cache 104 per clock cycle if there are no i-cache misses. The address may be incremented by a next fetch predictor 106. A branch direction predictor 108 may be coupled to each of the next fetch predictor 106 and the control flow evaluation logic 112 in a later pipeline stage. The predictor 108 may predict information of instructions that change the flow of an instruction stream from executing a next sequential instruction.

The decode unit 110 decodes the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. In one embodiment, the control flow evaluation block 112 may alter fetch of instructions in the address selector 102. For example, an absolute address value associated with an unconditional branch opcode may be sent to the address selector 102.

Rename intra-group dependency detection logic 114 may find dependencies among instructions decoded by the decode unit 110. An intra-group of instructions may include decoded instructions from one or more clock cycles, or pipeline stages. Dependencies such as write-after-read (WAR), write-after-write (WAW) and read-after-write (RAW) may be detected. Dependency vectors that indicate dependencies between instructions may be generated. The mapper 116 may divide instructions among distributed hardware resources using factors such as available concurrency, criticality of dependence chains, and communication penalties.

In addition to out-of-order issue of instructions to execution units within a superscalar microarchitecture, the processor 100 may perform register renaming to increase throughput. The processor 100 may include a set of physical registers larger than a set of integer and floating-point architecturally visible registers, such as the physical register file 164. Using hardware, the processor 100 dynamically renames an architectural register identifier used for a destination operand. In response to determining a source operand has a same architectural register identifier as a renamed destination operand, the processor 100 may assign to the source operand a same physical register identifier used to rename the destination operand. The renaming may occur after instruction decode.

When a destination operand is renamed, a new physical register number from the free list allocator 130 may be used. Alternatively, an undefined physical register number may be used, which is not associated with any one of the multiple physical registers within the physical register file 164. Rather, this physical register number is associated with a particular numerical value. When an instruction commits, a physical register storing the instruction destination value becomes a candidate to return to a free list of rename register numbers within the free list allocator 130. However, if an undefined physical register number is used for the destination operand, no rename register number was previously removed from the free list during the rename pipeline stage for this instruction. Similarly, no rename register number is added to the free list during commit and retirement of this instruction.

When the hardware renames an architectural register identifier with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

The register rename unit 120 may include rename control logic and array 122 and zero cycle initialization logic 124. The register rename unit 120 may determine which physical register numbers to use to rename architectural register numbers used in both destination and source operands within instructions. The register rename unit may select candidate physical register numbers from the free list allocator 130, a rename mapping table within the rename control logic 122, or the zero cycle initialization logic 124.

The register rename unit may determine a given instruction qualifies to be converted to a zero cycle operation as described earlier. The register rename unit 120 may assign the destination operand a rename register number associated with a particular numerical value and not associated with an actual physical register within the physical register file 164. Additionally, the register rename unit 120 may mark the given instruction in a manner to prevent it from proceeding for instruction execution. For example, the register rename unit 120 may mark the move instruction as complete at a dispatch pipeline stage.

After instructions have been decoded and renamed, associated entries may be allocated in the dispatch queue 140. Instructions and associated renamed identifiers, program counter (PC) values, dependency vectors, markings for completion, and so forth may be sent to the dispatch queue 140 and later to the scheduler 150. Various exceptions may be detected, such as by the execution core 160. Examples include protection exceptions for memory accesses, no address translation, and so forth. The exceptions may cause a corresponding exception handling routine to be executed, such as by the microcode 142.

The scheduler 150 may schedule instructions for execution in the execution core 160. When operands are available and hardware resources are also available, an instruction may be issued out-of-order from the scheduler 150 to one of the functional units within the execution core 160. The scheduler 150 may read its source operands from the physical register file 164 after translating renamed identifiers with a mapping table or from operand bypass logic. When particular rename register numbers are used that are associated with a particular numerical value, but not associated with an actual physical register, then the read bypass logic 166 may provide the particular numerical value. In such a case, no actual physical register may be accessed. The source operands may be provided to the execution core 160.

The execution core 160 may include a load/store unit. The load/store unit may be connected to a data cache (not shown) and the store buffer 172 either directly or through the reorder buffer (rob) 170. The processor 100 may include a translation look-aside buffer (TLB) for each of the i-cache 104 and the data cache to avoid a cost of performing a full memory translation when performing a cache access. The store buffer 172 may store addresses corresponding to store instructions. The rob 170 may receive results from the execution core 160. In addition, results may be bypassed to previous pipeline stages for data forwarding to dependent instructions already in the pipeline. The rob 170 may ensure in-order commit and retirement of instructions.

Figure 2:
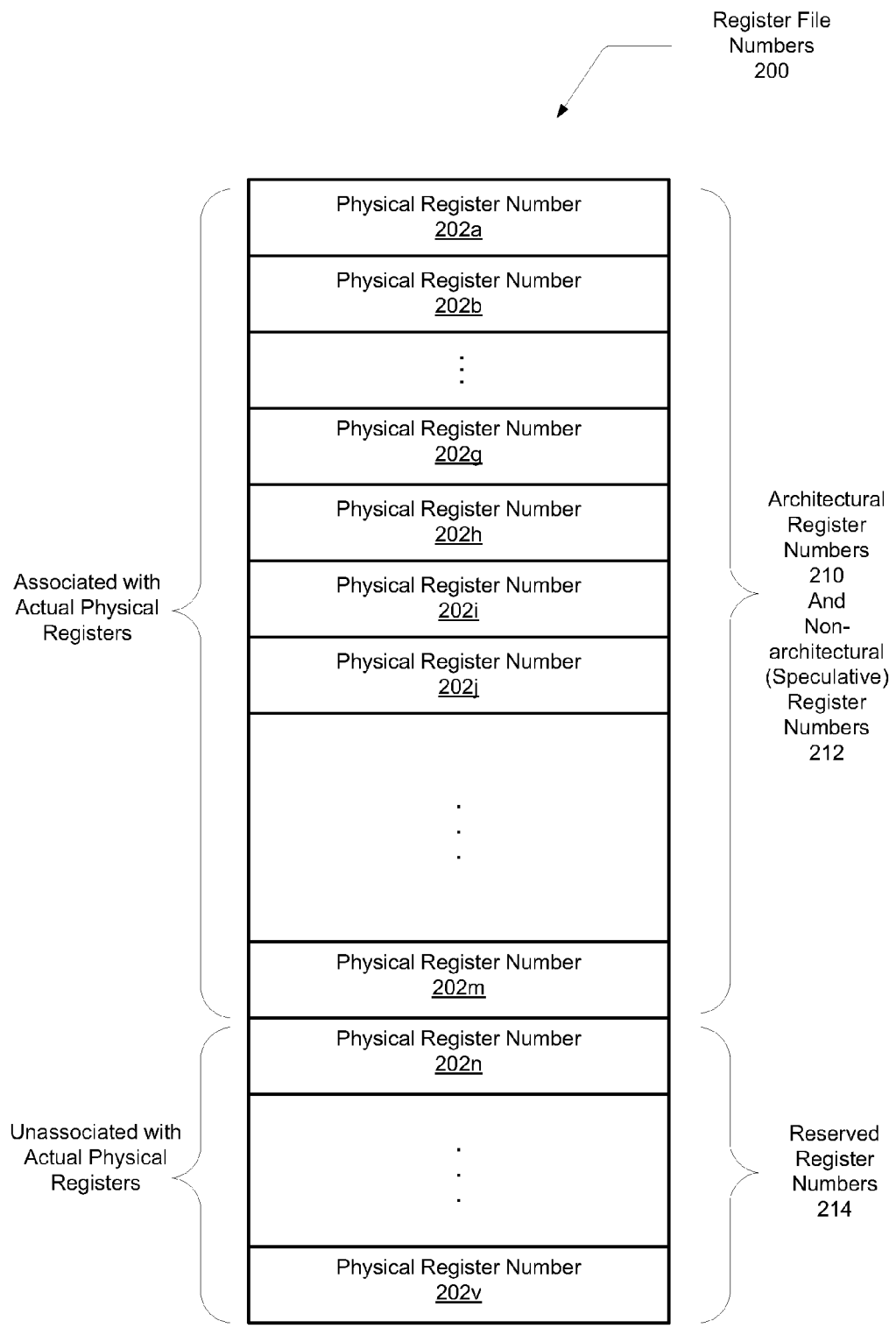
FIG. 2 is a generalized block diagram of one embodiment of physical register file numbers.

Referring to FIG. 2, a generalized block diagram of one embodiment of a table including register file identifiers or numbers 200 is shown. In one embodiment, the register numbers 200 are a sequential list of numbers identifying available rename register numbers to use for register renaming. In alternative embodiments, the register numbers need not be sequential. In one embodiment, the register numbers 200 include both identifiers for actual physical registers 202a-202m and reserved identifiers 202n-202v that do not identify actual physical registers. For example, register number 202a may have an identifier "0", physical register number 202b may have an identifier "1", and so forth.

The register numbers 202a-202m may be used for a register file that includes both architectural physical registers and non-architectural (speculative) physical registers. The architectural registers may have identifiers that are architecturally visible. The identifiers for the non-architectural (speculative) registers may not be architecturally visible. In some embodiments, the physical registers for both the architectural physical registers and non-architectural (speculative) physical registers may be intermingled among one another within the register file. A mapping mechanism may then be used to determine the location of a given architectural register within the register file. For example, a given architectural register with the identifier r7 may be mapped to a non-architectural (speculative) register with the identifier P23. At a later time, the register r7 may be mapped to a different non-architectural (speculative) register such as P12.

In one embodiment, a given physical register file may include 120 physical registers, and a given instruction set architecture (ISA) associated with the physical register file may have 35 architecturally visible registers. In such a case, the register file includes 85 physical registers additional to the 35 architecturally visible registers. In this example, the register numbers associated with the 85 physical registers are included in the non-architectural register numbers 212. In one example, the architectural and non-architectural (speculative) physical register numbers 202a-202m may represent contiguous rename register numbers 0 to 119, or h0 to h77. Again, the architectural register numbers 210 and the non-architectural register numbers 212 are associated with actual physical registers.

In one embodiment, an 8-bit index may be used to access the physical register file. In such a case the index may support accessing a maximum of 256 physical registers. However, due to power consumption, on-die real estate constraints, microarchitecture simulations, and/or other factors, the physical register file may be sized to be smaller than the maximum index-supported size. In one embodiment, even though the physical register file is smaller than the supported index size, one or more indexes that may not otherwise be associated with an actual physical register may still be used. As described earlier, a given rename register number not associated with an actual physical register may be associated with a particular numerical value. In the above example, the indexes 120 to 255 (e.g., corresponding to register numbers 202n-202v) do not identify actual physical registers. Therefore, these available rename register numbers may be used to rename a destination operand that is known to be written prior to an execution pipeline stage with a particular numerical value. For example, the physical register number 255, or hFF, may be associated with the numerical value 0. The physical register number 254, or hFE, may be associated with the numerical value 1. Although the physical register numbers are presented as contiguous values with a range between 0 and a maximum value represented by a multi-bit index, other combinations of physical register numbers within the reserved register numbers 214 and numerical values are possible and contemplated.

Figure 3:
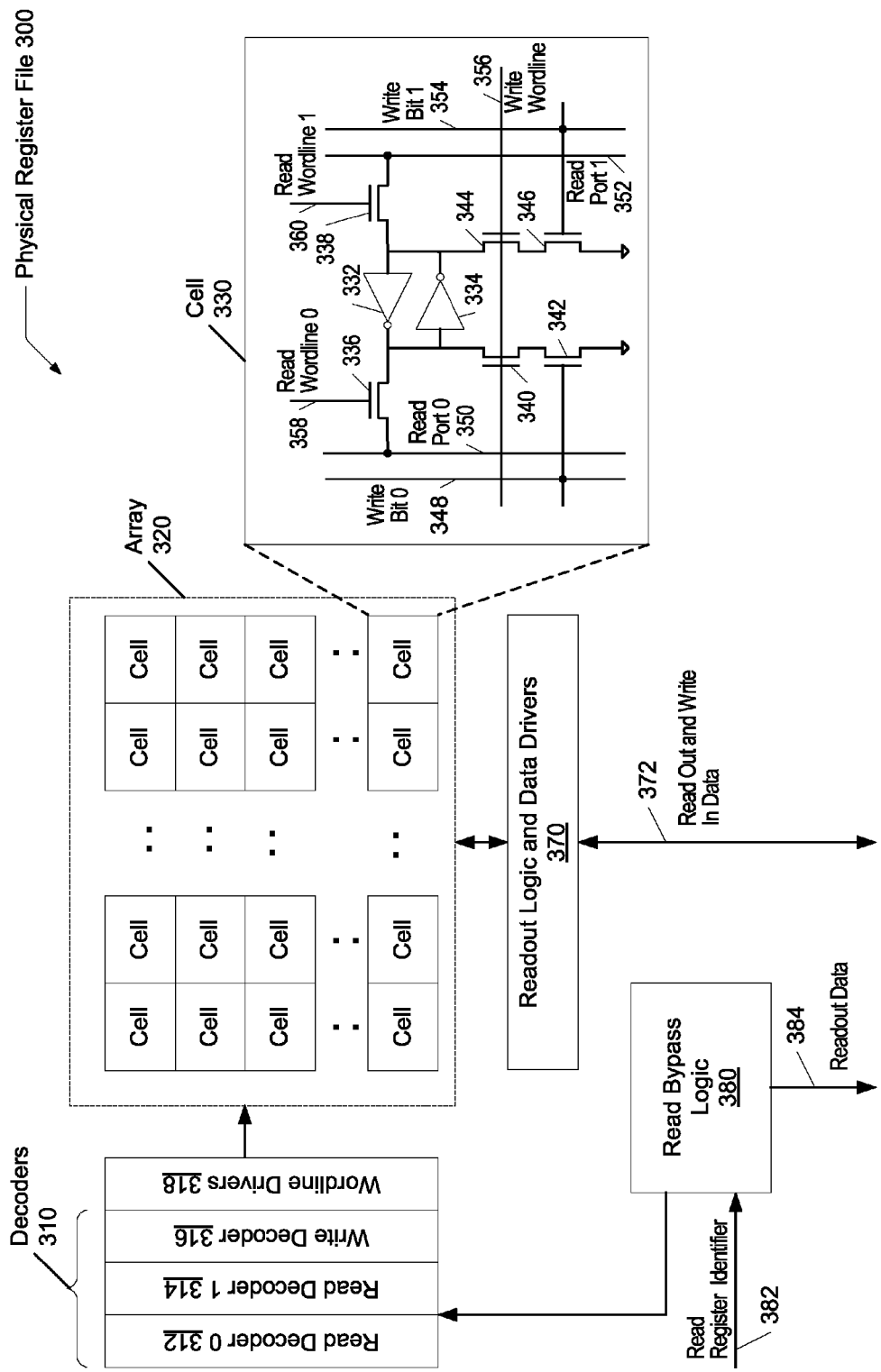
FIG. 3 is a generalized block diagram illustrating one embodiment of a physical register file.

Turning now to FIG. 3, a generalized block diagram of one embodiment of a physical register file 300 is shown. As shown, the physical register file 300 includes an array 320, multiple decoders 310, readout logic and data drivers 370, and read bypass logic 380. The array 320 includes multiple cells, wherein each cell 330 may store a bit of information for an associated register. The information may include status information and data corresponding to an operand. Regarding the microarchitecture of a processor, the physical register file 300 is a large pool of registers. As described earlier, a portion of these registers are architectural registers visible to a software programmer and a compiler. The remaining registers may be non-architectural registers used during the register renaming process.

As can be seen in FIG. 3, the physical register file 300 contains much circuitry and an access of the physical register file 300 may consume an appreciable amount of power. In addition, the access may include an appreciable delay before receiving an associated output or response. However, for certain read operations, the read bypass logic 380 may provide the readout data 384 without the circuitry within the decoders 310, the wordline drivers 318, the array 320, and the readout logic 370 being used. For example, in response to the readout bypass logic 380 receives a read register identifier 382 that identifies a reserved physical register number unassociated with an actual physical register, but associated with a particular numerical number, the readout bypass logic provides the particular numerical number on the output lines indicated by readout data 372. The circuitry within the decoders 310, the wordline drivers 318, the array 320, and the readout logic 370 is not used. Therefore, both power consumption and latency are reduced for this type of access.

During operation, the physical register file 300 may receive a read register identifier 382. The read register identifier 382 may be a rename register number (physical register number) for a source operand of a read operation or a destination operand for a write operation. The decoders 310 and the wordline drivers 318 may receive control signals (not shown) that indicate whether an access is for a read operation or a write operation. Additionally, the decoders 310 and the wordline drivers 318 may receive the read register identifier on line 382 via the read bypass logic 380. Alternatively, the decoders 310 and the wordline drivers 318 may directly receive the read register identifier on line 382.

However, the read bypass logic 380 may send control signals to the decoders 310 and the wordline drivers 318 determining whether this circuitry produces valid output to send to the array 320. For example, if the read bypass logic 380 determines a read register identifier on line 382 corresponds to a zero cycle register initialization operation, then the logic 380 may prevent the circuitry within the components 310-370 from being used for the access. Rather, the logic 380 provides the associated readout data on line 384.

The array 320 is typically implemented as an on-die static random access memory (RAM) with dedicated read and write ports. One implementation of the cell 330 is illustrated in FIG. 3. Typically, each of the decoders 312-316 includes a series of Boolean logic AND gates that drive appropriate word line logic within the wordline drivers 318. In the embodiment shown, the decoders 310 include two read decoders 312 and 314 and one write decoder 316. Accordingly, a given cell 330 within the array 320 includes two read wordlines, which are wordline 0 on line 358 and wordline 1 on line 360. Additionally, the cell 330 includes two read ports, which are read port 0 on line 350 and read port 1 on line 352. Similarly, the cell 330 includes a single write wordline on line 356. In other embodiments, a different number of read decoders, read ports, write decoders and write wordlines may be used.

As shown, each cell 330 has back-to-back inverters 332 and 334 for storing information within the cell 330. The output of each of the inverters 332 and 334 may provide either the associated bit value for the cell or an inverted version of the bit value. A logic high value may be equivalent to the value of a power reference. A logic low value may be equivalent to the value of a ground reference.

During a write operation, the write wordline is asserted to a logic high value on line 356 for a particular row. The wordline drivers 318 assert the write wordline. Appropriate data values are placed on each of the write bit 0 on line 348 and the write bit 1 on line 354 by data driving circuitry in the block 370. These values cause one of the two nodes tied to the pair of inverters 332 and 334 to be discharged to a logic low value via either the transistor stack including nmos transistors 340 and 342 or the transistor stack including nmos transistors 344 and 346.

When a read operation is not handled by the read bypass logic 380, the circuitry within the components 310-370 is used. During such a read operation, one or both of the read wordlines on lines 358 and 360 are asserted to a logic high value. One or both of the nmos transistors 336 and 338 are turned on. Accordingly, the state stored by the pair of inverters 332 and 334 is provided to one or both of the read ports on lines 350 and 352. The values on the lines 350 and 352 are provided to the readout logic in the circuitry block 370. This readout logic may include one or more of latches, flip flops, and sense amplifiers. As can be seen from the block diagram and the circuit description for the physical register file 300, when the read bypass logic 380 is able to provide readout data for zero cycle register initialization operations, the power consumption associated with the circuitry components 310-370 may be avoided. In addition, the latency for the read operation may be reduced.

Figure 4:
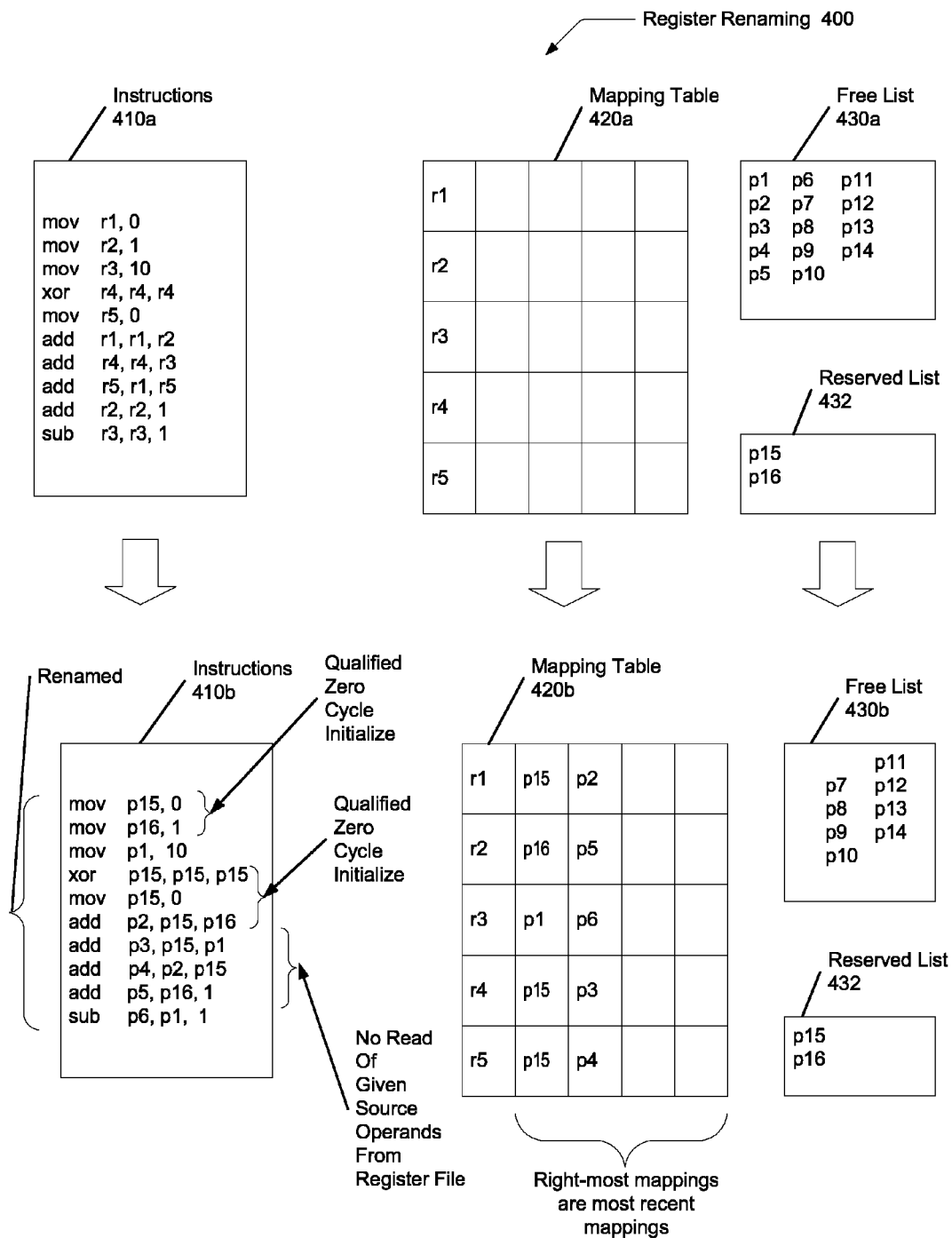
FIG. 4 is a generalized block diagram illustrating one embodiment of register renaming with converted zero cycle operations.

Turning now to FIG. 4, a generalized block diagram illustrating one embodiment of register renaming 400 with zero cycle register initialization operations is shown. A simplified example of an unrolled loop includes the instructions 410a. In this example, a destination operand is listed first after an instruction mnemonic followed by one or more source operands. Registers use the general nomenclature of "r" followed by a register identifier. For example, register 1 is denoted by "r1". The original loop used to derive the unrolled code with instructions 410a is shown in the following:

```
       mov   r1, 0
       mov   r2, 1
       mov   r3, 10
       xor   r4, r4, r4
       mov   r5, 0
loop:
       add   r1, r1, r2
       add   r4, r4, r3
       add   r5, r1, r5
       add   r2, r2, 1
       sub   r3, r3, 1
       jnz   loop
```

Although a loop is used here, a loop is unnecessary for determining register initialization operations may be zero cycle register initialization operations. This determination and a subsequent creation of a zero cycle operation may be used for various types of code. The instructions 410a utilize five architectural registers labeled r1-r5. These physical register numbers are associated with actual physical registers. The instructions 410a are meant to be a pseudocode example and language agnostic. The mapping table 420a generally shows a data structure for storing mappings between architectural register numbers and physical register numbers.

The free list 430a shows a data structure for indicating the non-architectural physical register numbers available for renaming purposes. These physical register numbers are also associated with actual physical registers. In this example, there are 14 physical register names using the general nomenclature of "p" followed by a register identifier. The free list 430a shows each one of the physical registers p1-p14 is available for register renaming.

The reserved list 432 shows a grouping of at least one physical register number for renaming purposes. In this example, there are 4 physical register names using the general nomenclature of "p" followed by a register identifier. In this example, these register identifiers are numbered higher than the physical register names in the free list 430a. Unlike the physical register names in the free list 430a, each of the physical register names in the reserved list 432 is not associated with an actual physical register. Rather, the physical register names in the reserved list 432 are associated with particular numerical values. For example, the physical register name p15 may be associated with the numerical value 0. Similarly, the physical register name p16 may be associated with the numerical value 1.

In one example, a 4-bit index may be used to identify physical register numbers. Therefore, 16 distinct physical register numbers may be identified by a 4-bit index such as the physical register names p1-p16. However, there may be only 14 actual physical registers in a physical register file. Modern processors use larger numbers than provided in this example. This simplified example is used for illustrative purposes. With 5 architectural registers, such as r1 to r5, a one-to-one renaming may occur with the first five physical register names p1-p5. There are 9 more physical registers. Therefore, the physical register names p6-p14 are non-architectural physical register names, but each one is still associated with an actual physical register. The remaining 2 physical register names, which are p15 and p16, may be used to represent particular numerical values. In this example, the numerical values are 0 and 1, respectively.

Referring to the instructions 410*b*, these instructions are the same as the instructions 410*a*, however, register renaming has occurred for each of the instructions. The renaming process may rename one or more instructions in a given pipeline stage. Any number of instructions per pipeline stage may be chosen for simultaneous processing. The mapping table 420*b* stores the mappings for each of the instructions. The mapping table 420*b* shows the stored mappings between architectural register numbers and physical register numbers and reserved register numbers for each of the instructions. The free list 430*b* shows each of the physical registers p7-p14 is still available after each one of the instructions 410*b* has been renamed. Each of the physical registers p1-p6 has been used to rename architectural registers r1-r5 in the instructions 410*b*.

The reserved list 432 shows each one of the reserved physical numbers p15-p16 is still available after each one of the instructions 410*b* has been renamed. However, the mapping table 420*b* shows each one of the reserved physical numbers p15 and p16 has been used to rename one or more of the architectural registers r1-r5. Each of the reserved physical numbers p15-p16 is associated with a numerical value, rather than an actual physical register. Therefore, each of the reserved physical numbers p15-p16 does not change from being available to being unavailable for renaming purposes. Any given one of the reserved physical numbers p15-p16 may be used for renaming a first architectural register in a first instruction followed by being used to rename a second architectural register in a younger second instruction although the first instruction may not have yet committed.

Looking at the instructions 410*b*, the first instruction qualifies to be converted to a zero cycle register initialization operation. This mov instruction is a move immediate operation and writes the numerical value 0 into the destination operand, which is register r1. The reserved physical register number p15 is associated with the numerical value 0. Therefore, the register r1 is renamed to p15. This mapping is shown in the mapping table 420*b*. This mov instruction may be marked to prevent it from proceeding to an execution pipeline stage in the processor. For example, the mov instruction may be marked as complete at a dispatch pipeline stage. In such embodiments, power consumption may be reduced within the processor since the mov instruction may not proceed past the dispatch pipeline stage. In addition, throughput for other instructions may increase as the mov instruction does not utilize multiple resources after the dispatch pipeline stage that would otherwise be used. Further, the size of the free list 430*b* increases, since each one of the physical registers p1-p14 is still available for register renaming. An increased free list size may also contribute to a performance improvement.

The renaming logic may assign the reserved physical register number p15 to source operands with a same identifier as the register r1 in instructions younger in-program-order than this first mov instruction. This bypassing of the physical register number p15 may occur until a younger instruction uses the register r1 as a destination operand that is unknown to be written with the numerical value 0. When these younger instructions access the physical register file for the source operands renamed to p15, read bypass logic within the physical register file may convey the numerical value 0 on data output lines. No actual physical register may be accessed during the read operations corresponding to the source operands renamed to p15.

Similarly, the second instruction qualifies to be converted to a zero cycle register initialization operation. This mov instruction is a move immediate operation and writes the numerical value 1 into the destination operand, which is register r2. The reserved physical register number p16 is associated with the numerical value 1. Therefore, the register r2 is renamed to p16. This mapping is shown in the mapping table 420*b*. This second mov instruction may be marked to prevent it from proceeding to an execution pipeline stage in the processor. Similar to the renaming for the register r1 discussed above, various benefits such as reduced power consumption and increased instruction throughput may be obtained since the second mov instruction does not proceed through the execution pipeline stage.

The renaming logic may assign the reserved physical register number p16 to source operands with a same identifier as the register r2 in instructions younger in-program-order than this second mov instruction. This bypassing of the physical register number p16 may occur until a younger instruction uses the register r2 as a destination operand that is unknown to be written with the numerical value 1. When these younger instructions access the physical register file for the source operands renamed to p16, read bypass logic within the physical register file may convey the numerical value 1 on data output lines. No actual physical register may be accessed during the read operations corresponding to the source operands renamed to p16.

The third instruction is a move immediate operation, but in this example, it does not qualify to be converted to a zero cycle register initialization operation. The third instruction writes the numerical value 10 into the register r3. In this example, none of the reserved physical register numbers p15-p93 is associated with the numerical value 10. Therefore, the register r3 is renamed to the physical register number p1. This mapping is shown in the mapping table 420*b*.

The fourth instruction is a Boolean logic XOR operation. Each of the source operands has a same architectural register name, which is r4. Therefore, it is known the result is 0 and the destination operand will be written with the numerical value 0. Sometimes a software programmer may intentionally use a Boolean logic XOR operation to reset a given register, rather than use a move immediate operation. In some hardware implementations, it is known the Boolean logic XOR operation has a smaller latency than a move immediate operation. For the fourth instruction, the destination operand has the same architectural register name as the source operands, but the instruction qualified to be a zero cycle operation outside of this characteristic. The reserved physical register number p15 is associated with the numerical value 0. Therefore, the register r4 is renamed to p15. This mapping is shown in the mapping table 420*b*. In addition, the Boolean logic XOR instruction may too be marked to prevent it from proceeding to an execution pipeline stage in the processor. Bypassing of the renamed register number and use of the read bypass logic during access of the physical register file may occur as described earlier regarding the reserved physical register p15 for the first mov instruction.

The fifth instruction qualifies to be converted to a zero cycle register initialization operation. This mov instruction is a move immediate operation and writes the numerical value 0 into the destination operand, which is register r5. The renaming, marking, bypassing and physical register file accessing steps described earlier for the first mov instruction applies here for this fifth instruction.

The sixth instruction is an arithmetic ADD operation. This instruction does not qualify to be converted to a zero cycle operation. Each of the source operands r1 and r2 are renamed to p15 and p16 due to access of the mapping table 420b and bypassing of the rename values. The destination operand is renamed to p2. For each of the seventh to tenth instructions, similar steps are taken as for the sixth instruction. None of the seventh to tenth instructions qualifies to be converted to a zero cycle operation.

Figure 5:
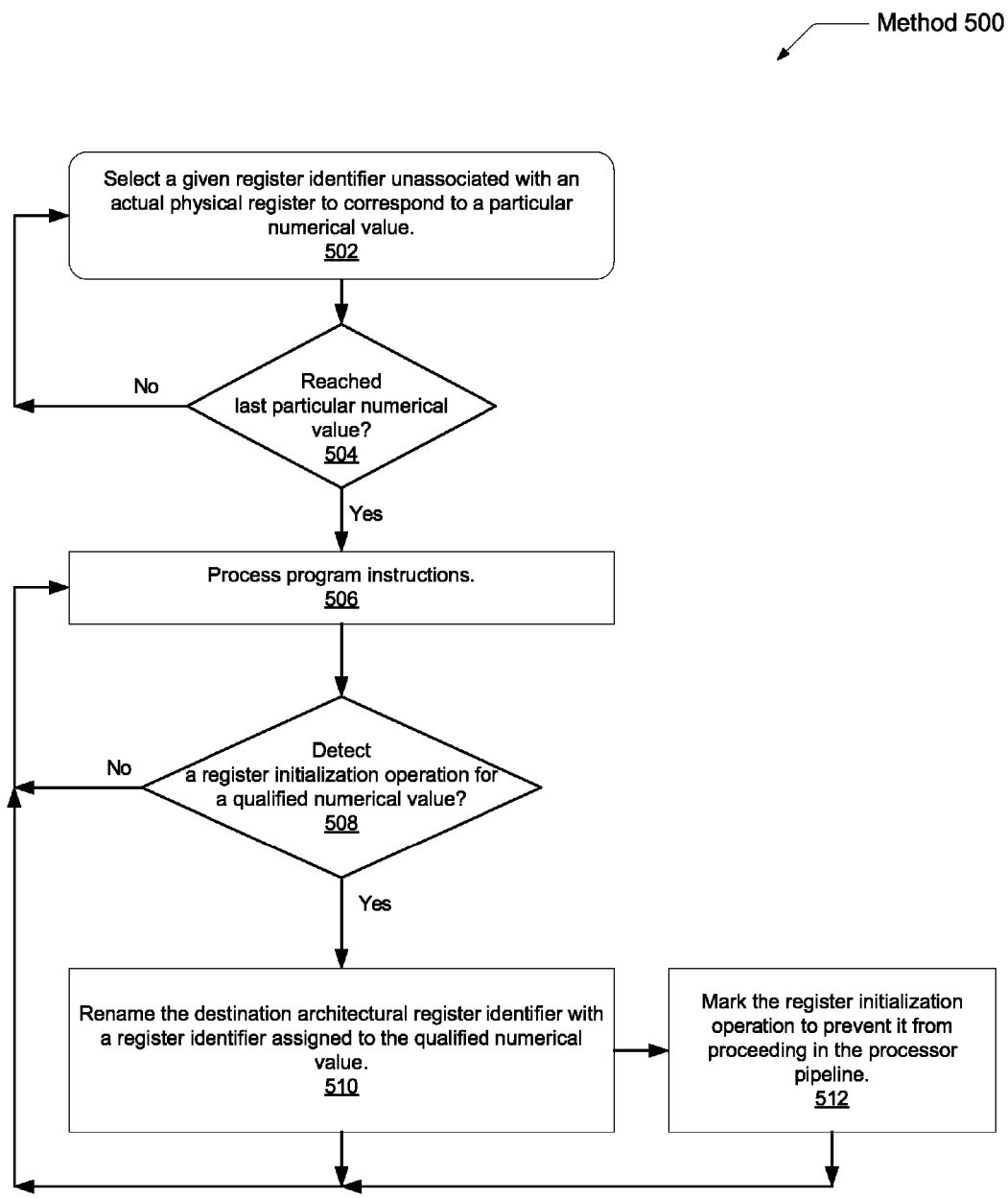
FIG. 5 is a generalized flow diagram illustrating one embodiment of a method for creating zero cycle register initialization operations.

Referring now to FIG. 5, a generalized flow diagram of one embodiment of a method 500 for creating zero cycle operations is shown. In block 502, a given register identifier unassociated with an actual physical register is selected to correspond to a particular numerical value (e.g., is assigned to represent the particular numerical value). If the last particular numerical value has been reached (conditional block 504), then in block 506, program instructions may be processed. The instructions may be compiled, fetched from memory, decoded and executed. For purposes of discussion, the steps in this embodiment are shown in a particular order. However, in other embodiments some steps may occur in a different order than shown, some steps may be performed concurrently, some steps may be combined with other steps, and some steps may be absent.

After decoding, a given instruction may be determined to be a register initialization operation for a qualified numerical value. An opcode and source operands may be checked to make this determination. Control logic may determine prior to an execution pipeline stage associated with a particular decoded instruction that the particular instruction writes a qualified numerical value in its destination operand. In one embodiment, the logic determines the instruction has an opcode for a move immediate instruction and the immediate value is a qualified numerical value.

In some embodiments, one of the one or more qualified numerical values is the value 0. In such a case, the control logic may determine an instruction has an opcode for a Boolean logical operation, such as an AND or an XOR. In addition, the logic determines from the source operands that a result of 0 will be written in the destination operand during a later execute pipeline stage. For example, a source operand of 0 for the Boolean logic AND operation yields a result of 0. Similarly, two equal source operands for the Boolean logic XOR operation yield a result of 0. Further, the control logic may determine a decoded instruction has an opcode for a particular arithmetic operation and particular values for the source operands may cause a result of 0 to be written in the destination operand during a later execute pipeline stage. For example, an arithmetic subtraction operation with two same source operands yields a result of 0. Similarly, an arithmetic multiplication operation with a source operand of 0 produces a result of 0.

For at least each of the above cases of determining a result of 0 is to be written in the destination operand in a later execution pipeline stage, the similar steps described earlier regarding register renaming with a particular rename register identifier that is not associated with an actual physical register may be used. If a given instruction is not determined to be a register initialization operation for a qualified numerical value (conditional block 508), then control flow of method 500 may return to block 506. For example, the source and destination operands of the given instruction may be renamed with rename register identifiers associated with actual physical registers in a physical register file. Processing of program instructions continues.

If a given instruction is determined to be a register initialization operation for a qualified numerical value (conditional block 508), then in block 510 the destination architectural register identifier may be renamed with a register identifier assigned to the qualified numerical value. This register identifier may be unassociated with an actual physical register in a physical register file. In a later pipeline stage, the physical register file may convey a value of the qualified numerical value without accessing an actual physical register when it receives this particular rename register identifier as a source operand to read. In one embodiment, the qualified numerical value is zero. However, other numerical values are possible and are contemplated as qualified values. In block 512, the register initialization operation may be marked to prevent it from proceeding in the processor pipeline. For example, the operation may be marked as complete at a dispatch pipeline stage. As discussed above, power consumption may be reduced within the processor since the register initialization operation does not proceed through the pipeline. In addition, throughput for other instructions may increase as the register initialization operation does not utilize multiple resources (queues, execution unit, staging flops, and so forth) in later stages of the pipeline. Additionally, the size of the free list increases since none of the physical registers is used for register renaming in this case. An increased free list size may also contribute to a performance improvement.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a decoder configured to decode fetched instructions;
read bypass logic;
a physical register file including a plurality of physical registers, each identified by an associated rename register identifier; and
a register rename unit configured to receive decoded instructions;
wherein in response to each detection of an instruction that is configured to write a given numerical value to a destination identified by a destination operand of the instruction, the register rename unit is configured to:
assign a given rename register identifier to the destination operand without considering numerical values stored in the physical register file as a result of previously executed instructions, wherein the given rename register identifier indicates the given numerical value; and
prevent the instruction from proceeding for further execution;
wherein in response to a read corresponding to the given rename register identifier, the processor is configured to:
convey the given rename register identifier to the read bypass logic of the physical register file;
if the first rename register identifier does not correspond to the given rename register identifier, perform an access of one of the plurality of physical registers; and
if the first rename register identifier corresponds to the given rename register identifier, prevent an access of the plurality of physical registers and convey the given numerical value from the read bypass logic.

2. The processor as recited in claim 1, wherein the given rename register identifier indicates the given numerical value each time it is used by the processor.

3. The processor as recited in claim 1, wherein in response to said detecting, an indication is stored which indicates instruction completion.

4. The processor as recited in claim 1, wherein the processor comprises:
a memory array corresponding to the plurality of physical registers; and
wherein if the first rename register identifier corresponds to the given rename register identifier, the processor is configured to prevent circuitry of said memory array from being used for an access associated with the first rename register identifier.

5. The processor as recited in claim 1, wherein the processor further comprises a free list comprising a plurality of rename register identifiers available for renaming operands in the decoded instructions, wherein in response to each assignment of the given rename register identifier to a destination operand, no rename register identifiers are removed from the free list.

6. The processor as recited in claim 1, wherein the register rename unit is configured to assign the given rename register for use by multiple instructions concurrently.

7. The processor as recited in claim 1, wherein detecting said instruction is configured to write the numerical value comprises detecting (i) an opcode for a move instruction and (ii) an immediate source operand of the move instruction with a same value as the numerical value.

8. The processor as recited in claim 5, wherein in response to a commit of each instruction with a destination operand assigned to the given rename register identifier, no rename register identifiers are added to the free list.

9. A method comprising:
decoding fetched instructions; and
in response to each detection of an instruction that is configured to write a numerical value to a location identified by a destination operand:
assigning a given rename register identifier to the destination operand without considering numerical values stored in a physical register file as a result of previously executed instructions, wherein the given rename register identifier indicates the numerical value; and
preventing the instruction from proceeding for further execution, and
in response to a read corresponding to the given rename register identifier:
conveying the given rename register identifier to read bypass logic of the physical register file;
if the first rename register identifier does not correspond to the given rename register identifier, performing an access of one of the plurality of physical registers; and
if the first rename register identifier corresponds to the given rename register identifier, preventing an access of the plurality of physical registers and conveying the given numerical value from the read bypass logic.

10. The method as recited in claim 9, wherein the given rename register identifier indicates the numerical value each time it is used.

11. The method as recited in claim 9, wherein said detecting comprises detecting (i) an opcode for a move instruction and (ii) an immediate source operand of the move instruction has a same value as the numerical value.

12. The method as recited in claim 9, wherein detecting said instruction is configured to write the numerical value in the destination operand comprises detecting (i) each of the source operand identifiers is a same value and (ii) an opcode corresponds to a predetermined operation.

13. An apparatus comprising:
control logic; and
a physical register file including a plurality of physical registers, each identified by an associated rename register identifier;
wherein in response to each detection of an instruction that is configured to write a numerical value in a destination operand, the control logic is configured to:
assign a given rename register identifier to the destination operand without considering numerical values stored in the physical register file as a result of previously executed instructions, wherein the given rename register identifier is mapped to the numerical value; and
prevent the instruction from proceeding for further execution, and
wherein in response to a read corresponding to the given rename register identifier, the apparatus is configured to:
convey the given rename register identifier to read bypass logic of the physical register file;
if the first rename register identifier does not correspond to the given rename register identifier, perform an access of one of the plurality of physical registers; and
if the first rename register identifier corresponds to the given rename register identifier, prevent an access of the plurality of physical registers and convey the given numerical value from the read bypass logic.

14. The apparatus as recited in claim 13, wherein the given rename register identifier indicates the numerical value each time it is used.

* * * * *